US007353605B2

(12) United States Patent
Cormier et al.

(10) Patent No.: US 7,353,605 B2
(45) Date of Patent: Apr. 8, 2008

(54) METHOD FOR PRODUCING A METALLIC CORE FOR USE IN CYLINDER SLEEVES FOR AN ELECTROPHOTOGRAPHIC PROCESS

(75) Inventors: Steven O. Cormier, West Henrietta, NY (US); Thomas N. Tombs, Rochester, NY (US); Edward T. Miskinis, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 557 days.

(21) Appl. No.: 10/903,340

(22) Filed: Jul. 30, 2004

(65) Prior Publication Data

US 2006/0021226 A1 Feb. 2, 2006

(51) Int. Cl.
*B21K 1/02* (2006.01)
*B23P 17/00* (2006.01)

(52) U.S. Cl. ............................... 29/895.32; 29/895.21; 29/895.3; 29/557; 492/57; 492/60

(58) Field of Classification Search ............ 29/895.21, 29/895.212, 895.32, 895.3, 557; 492/57, 492/60
See application file for complete search history.

(56) References Cited

U.S. PATENT DOCUMENTS 3,823,456 A * 7/1974 Schneider et al. ....... 29/895.32
2005/0113230 A1* 5/2005 Hirasawa et al. ............ 492/53

FOREIGN PATENT DOCUMENTS

WO WO 9426534 A1 * 11/1994

* cited by examiner

*Primary Examiner*—Essama Omgba
(74) *Attorney, Agent, or Firm*—F. Lindsey Scott; Lawrence P. Kessler; David A. Novais

(57) ABSTRACT

An improved method for producing a metallic core for use in the production of a blanket cylinder or an image cylinder sleeve for use in electrophotographic processes. The sleeves includes aluminum or other suitable metal, which is rendered more suitable for use as a sleeve surface by oxidation.

14 Claims, 1 Drawing Sheet

METHOD FOR PRODUCING A METALLIC CORE FOR USE IN CYLINDER SLEEVES FOR AN ELECTROPHOTOGRAPHIC PROCESS

FIELD OF THE INVENTION

This invention relates to an improved method for producing a metallic core for use in the production of a blanket cylinder or an image cylinder sleeve for use in electrophotographic processes. The sleeves include a core of aluminum or other suitable metal, which is rendered more suitable for use as a sleeve surface by oxidation.

BACKGROUND OF THE INVENTION

In electrophotographic processes requiring an image cylinder and a blanket cylinder to produce electrophotographic copies, the image cylinder typically receives a charge, an image and a toner coating on the image area and then transfers the toner image to a blanket cylinder. The blanket cylinder transfers the toner image to a substrate, such as paper or the like, which passes via a web between the blanket cylinder and a back pressure roller to transfer the toner image to the substrate with the substrate thereafter being fused, as well known to the art.

In such processes, the image cylinder has a cylinder that typically includes a mandrel that may be of aluminum, steel or any other suitable and durable metal or conductive plastic of a suitable thickness to produce a non-compliant member that may be about 10 millimeters (mm) in thickness. The mandrel may include reinforcing structure internally and includes a very smooth, low out-of-round tolerance exterior.

The image cylinder includes a mandrel and a sleeve positioned over the outside of the mandrel and is used for production and transfer of the images to the blanket cylinder. The mandrel also includes bearings connected to each of its ends for positioning in an electrophotographic machine and has an air inlet into an interior of the mandrel for an air discharge to a plurality of holes placed around one end of the mandrel near a tapered end of the mandrel.

The blanket cylinder has a cylinder that typically includes a mandrel that may be of aluminum, steel or any other suitably durable metal or conductive plastic of a suitable thickness to produce a non-compliant member that may be about 10 mm in thickness. The blanket cylinder includes a mandrel and a sleeve positioned over the outside of the mandrel and is used for transfer of images from the blanket cylinder to a substrate.

The mandrel may include reinforcing structure internally and includes a very smooth, low out-of-round tolerance exterior. The mandrel also includes bearings connected to each of its ends for positioning in an electrophotographic copying machine and has an air inlet into an interior of the mandrel for an air discharge through a plurality of holes placed around one end of the mandrel near a tapered end of the mandrel.

The sleeves have been produced by the use of a metal core, which is typically a non-compliant metal member, such as aluminum, nickel, or the like, that may be produced by plating, extrusion or the like.

The production of metal cores by plating or the like has been found to be expensive and difficult to control sufficiently to produce a metal core of uniform thickness without nodules, voids or the like. While desirable cores have been produced in this manner, it is expensive and difficult to dependably produce high quality metal cores. In an alternate process, extrudates such as aluminum may be used. Such extrudates have a relatively constant internal diameter but the surface is relatively uneven for the purposes for which the metal cores are used. It has been found that such aluminum extrudates can be placed on a mandrel with an interference fit and machined to have a desired outside diameter and finish.

It has also been found, in the use of such cores, that if scratches or other defects occur on the core inside diameter during mounting or while on the mandrel it renders the installation and demounting of the mandrel with an interference fit by the air step method to be very difficult if not impossible. Further, such variations can result in difficulty in producing an exterior surface of the desired diameter and finish. It has also been found that when the core is placed on a mandrel with an interference fit in many instances the metal, such as aluminum, tends to gall, i.e., suffer extensive abrasive wear and deposit quantities of the inner surface of the aluminum extrudate on the exterior of the mandrel. Both of these events are very undesirable and result in a loss of tolerance control both on the exterior of the mandrel and the inside of the extrudate. Even if the outside of the extrudate as mounted on the mandrel has been machined to the desired diameter and tolerance, the loss of metal to the surface of the mandrel may result in an unacceptable variation in the outer diameter when the core produced from the extrudate is placed on another mandrel.

Since the use of metal extrudates allows the production of metal cores for the blanket cylinder and image cylinder sleeves much more economically, a method has been sought by which these difficulties and others can be obviated and metal cores having the desired tolerance produced more dependably from aluminum extrudates.

SUMMARY OF THE INVENTION

According to the present invention, such desirable cores are produced by a method for producing a metallic core having an oxidized inner surface and an oxidized outer surface for use in a blanket cylinder or an image cylinder for use in an electrophotographic process, the method comprising: producing a metallic tube having an inner diameter, an inner surface, an outer surface and an outer diameter, the inner diameter being smaller than the outer diameter of a mandrel so that the metallic tube can be mounted with an interference fit over the outer diameter of the mandrel; oxidizing the inner surface of the metallic tube to produce a metallic oxide layer on the inner surface of the metallic tube; positioning the oxidized inner surface metallic tube on a mandrel with an interference fit and machining an outer surface of the oxidized inner surface metallic tube to a desired diameter and finish; and, oxidizing the outer surface of the oxidized inner surface metallic tube to produce the metallic core having an oxidized inner surface metallic core having an oxidized inner surface and an oxidized outer surface of the oxidized inner surface.

Suitable extrudates are also produced by a method for producing an aluminum core having an oxidized inner surface and an oxidized outer surface for use in a blanket cylinder or an image cylinder for use in an electrophotographic process, the method comprising: producing an aluminum tube having an inner diameter, an inner surface, an outer surface and an outer diameter, the inner diameter being smaller than an outer diameter of a mandrel so that the aluminum tube can be mounted with an interference fit over the outer diameter of the mandrel; oxidizing the inner surface of the aluminum tube to produce an aluminum oxide layer on the inner surface of the aluminum tube; positioning the oxidized inner surface aluminum tube on a mandrel with an interference fit and machining an outer surface of the oxidizing inner surface aluminum tube to a desired diameter and finish; and, oxidizing the outer surface of the oxidized inner surface aluminum tube to produce the aluminum core having an oxidized inner surface and an oxidized outer surface.

The invention further provides an improvement in a method for producing a metallic core for use in blanket cylinder or an image cylinder for use in an electrophotographic process by producing a metallic tube having an inner diameter, an inner surface, an outer surface and an outer diameter, the inner diameter being smaller than the outer diameter of a mandrel so that the metallic tube can be mounted with an interference fit over the outer diameter of the mandrel and positioning the metallic tube on a mandrel with an interference fit and machining an outer surface of the metallic tube to a desired diameter and finish; the improvement comprising oxidizing the inner surface of the metallic tube prior to positioning the metallic tube on the mandrel.

The invention also provides an improvement in a method for producing an aluminum core for use in a blanket cylinder or an image cylinder for use in an electrophotographic process by producing an aluminum tube having an inner diameter, an inner surface, an outer surface and an outer diameter, the inner diameter being smaller than an outer diameter of a mandrel so that the aluminum tube can be mounted with an interference fit over the outer diameter of the mandrel and positioning the aluminum tube on a mandrel with an interference fit and machining an outer surface of the aluminum tube to a desired diameter and finish; the improvement comprising oxidizing the inner surface of the aluminum tube prior to positioning the aluminum tube on the mandrel.

The invention provides an image cylinder for an electrophotograpic process comprising: a metallic core having at least one of its inner and its outer surfaces oxidized; and, at least one layer of a photosensitive image-accepting layer around the outside of the outer surface of the metallic core. Blanket cylinders may also be produced comprising the cores of the present invention and a layer of image-transferring material around the outside of the core.

DESCRIPTION OF PREFERRED EMBODIMENTS

In the description of the Figures, the same numbers will be used to refer to the same or similar components. Further, additional components necessary for the operation of electrophotographic processes have not been shown since their description is not necessary to the description of the present invention.

Figure 1:
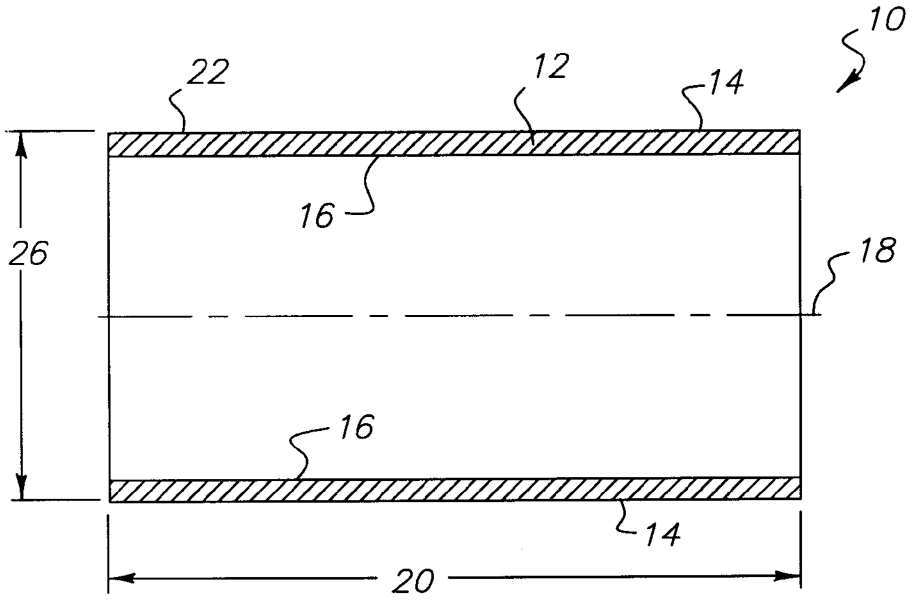
FIG. 1 is a cross-sectional view of a metal core according to the present invention.

FIG. 1 shows a cross-section of a metal core 10 for a blanket sleeve or an image cylinder sleeve. The core 10 includes a wall 12 having an outside 14, an inside 16 and a central axis 18. The core length is shown by the numeral 20. The outer diameter, designated by numeral 26, of the sleeve 22 must be uniform as discussed below.

Figure 2:
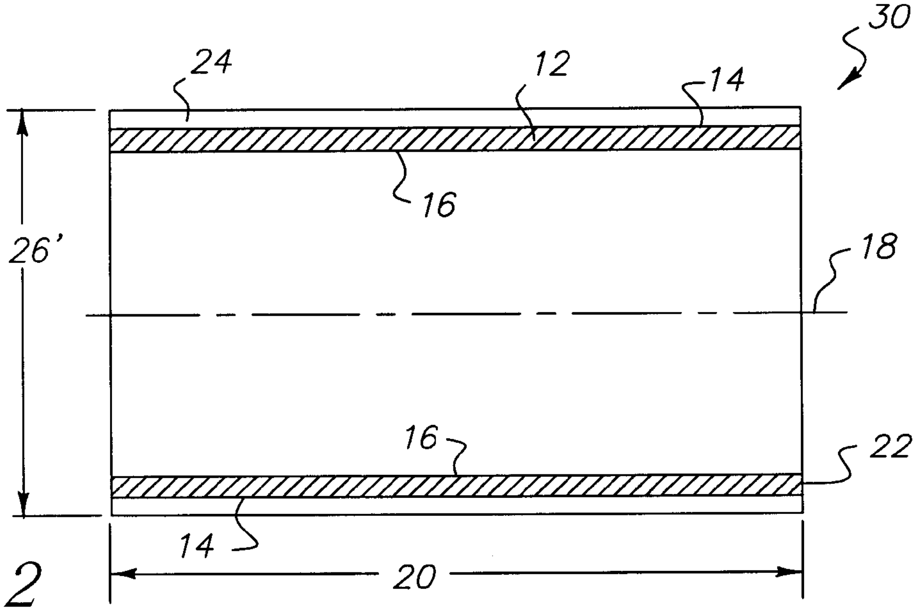
FIG. 2 is a cross-sectional view of a sleeve for an image cylinder or a blanket cylinder, including a metal core according to the present invention; and, FIG. 3 is a cross-sectional end view of the sleeve shown in FIG. 2.

In FIG. 2, a cylinder sleeve is shown. The cylinder sleeve includes electrophotographic layers 24 around the metal core 10. The outer diameter 26 of the sleeve 22 is selected to produce a sleeve of the desired outer diameter 26' when the electrophotographic layers are positioned around the outside of core 10. The outer diameter of the cylinder 30 is shown by the numeral 26', and as indicated previously must have a variation along the length 20 of the sleeve of no more than +/−12.5 microns. The layers deposited on the outside of the core may be as varied as a smoothing layer containing a high concentration of metal oxides, a barrier layer, a charge generation layer, and optionally additional layers. Such electrophotographic layers are well known to those skilled in the art and do not constitute a part of the present invention.

Figure 3:
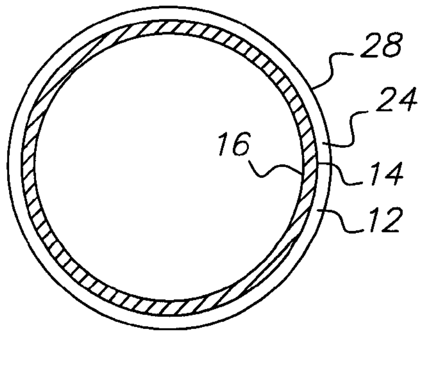

In FIG. 3, an end view of the cylinder of FIG. 2 is shown.

As discussed above, it has been found that the previously used nickel cores for the production of sleeves for the production of blanket cylinders and image cylinders have proven to be expensive and quality control has been a problem. In other words, when the cores are produced by plating, it is difficult to avoid the presence of occasional nodules, voids, wrinkles, cracks and other imperfections in the metal cores. Some of these irregularities can be machined away but frequently result in machining marks that are also unacceptable. In the case of cracks and the like, the metal core is not usable.

Since the production of nickel cores has been found to be expensive and difficult on a reliable basis, improved methods have been sought for producing metal cores. According to one method, metal extrudate seamless thin walled extrusion and the like have been used. These extrudates provide a constant diameter inner surface, which is readily mounted on a mandrel by an air step method as known to those skilled in the art for an interference fit. The extrudate is then readily machined to a desired outer diameter and finish. The extrudate when removed constitutes a metal core suitable for use in the production of the sleeves. Further the metal core, since it is produced on a common mandrel, has a constant inner diameter. Aluminum is a desirable material for this purpose. Unfortunately, aluminum is relatively soft and in some instances has been found to suffer scratching and other surface abrasions as or before it is interference mounted on the mandrel. This can result in the loss of sufficient air in the air step mounting procedure to render it difficult to position the aluminum extrudate or tubing on the mandrel or to remove the finished aluminum core after machining.

Further the aluminum has been found, in some instances, to gall on the mandrel. “Galling” refers to the removal of pieces of the aluminum extrudate inner liner that may adhere to the exterior of the mandrel or to abrasion wear resulting from the interference fit. This not only renders the inner diameter of the metal core variable, but also renders the outside of the mandrel of variable diameter in some instances. These are both undesirable variables and are desirably avoided.

According to the present invention, it has been found that in such machining operations, it is beneficial to oxidize the inside of the metal extrudate or tubing. The oxidized surface is harder and more readily placed on the mandrel by the air step technique. Further, the harder surface on the inside virtually eliminates galling. This is a very desirable improvement. The machining operation is conducted with the aluminum extrudate or tubing on the mandrel in an interference fit and after the machining operation has been completed the aluminum core is readily removed or treated in place to oxidize the outer surface of the metal core. This results in an outer surface that is not only harder but which is also relatively dielectric so that a more uniform core is provided for use in the production of blanket and image cylinders. As well known with respect to image cylinders, a smoothing layer may be placed immediately over the outside of the metal core to provide a conductive layer of relatively uniform conductivity.

Accordingly, placing an oxidized layer on the inside of the aluminum extrudate tubing or the like greatly facilitates the production of the metal core. Similarly, the positioning of the oxidized coating on the exterior of the core also provides a very desirable improvement. By the method of the present invention, not only are aluminum cores more readily produced but other metal cores are also readily produced. Desirably, these metals are selected from the group consisting of aluminum, nickel, chromium, copper, and rhodium. These materials may be used as tubes, extrudates and the like, which are suitable starting material configurations for the production of the metal cores. To the extent that these metals have an oxide state that is harder or has a lower coefficient of friction, the improvement of the present invention is effective.

Accordingly, the metal cores of the present invention are produced by producing a metallic tube having an inner diameter, an inner surface, an outer surface and an outer diameter, the inner diameter being smaller than the outer diameter of a mandrel so that the metallic tube can be mounted with an interference fit over the outer diameter of the mandrel; oxidizing the inner surface of the metallic tube to produce a metallic oxide layer on the inner surface of the metallic tube; positioning the oxidized inner surface metallic tube on a mandrel with an interference fit and machining an outer surface of the oxidized inner surface metallic tube to a desired diameter and finish; and, oxidizing the outer surface of the oxidized inner surface metallic tube to produce the metallic core having an oxidized inner surface metallic core and an oxidized outer.

Preferably the metal is aluminum and the oxide coating is an anodized coating, a heating-in-oxygen coating or a sputtering process coating. Oxide coatings may be produced by heating in an oxygen atmosphere to a temperature of at least 500° F. for a time sufficient to produce an oxide layer of the desired thickness. Similarly, sputtering processes, as known to those skilled in the art, can be used to coat both the inside and the outside of the metal core. Desirably, the oxide coating produced by the sputtering processes is no greater than about 700 nanometers.

The practice of the present invention constitutes a significant improvement over previous methods for producing the metal cores.

By the practice of the present invention, an image cylinder comprising a metallic core having at least one of its inner and its outer surfaces oxidized and at least one layer of a photosensitive image-accepting layer around the outside of the outer surface of the metallic core is produced. This image cylinder can be produced much more economically and of the same quality as produced by previous methods. Blanket cylinders may also be produced comprising the cores of the present invention and a layer of image-transferring material around the outside of the core.

The outside of the metal core must be sufficiently smooth and of proper diameter to result in the production of a blanket or image cylinder sleeve having suitable tolerances. For instance, the image cylinder and blanket cylinder require a variation in diameter from end to end of no more than about +/−12.5 microns. The size of the cylinders themselves may vary from about 2 centimeters to about 400 centimeters, but the variation in diameter over the length of the cylinder must be precisely controlled to these limits. Typically defects in the surface of the sleeve are unacceptable when such defects are of a size typically as small as 10 microns in cross-section and 3 microns in depth. Various other criteria may be applied depending upon the particular application to a particular electrophotographic process.

As indicated above, by the process of the present invention, metal tubing, extrudates, and the like can be readily produced of a desired diameter for positioning on a mandrel by an interference fit followed by machining to produce the metal core. As also discussed above, there are certain drawbacks to use of aluminum and other metals with respect to galling, scratching and the like during the interference mounting and demounting. These drawbacks are reduced by the use of an oxide layer on the inside, outside, or both, of the metal core to reduce scratching and the like and further by producing a dielectric core on the outside of the metal core. These advantages are readily achieved by oxidizing the surface of the metal sleeve as discussed above. Desirably, the sleeve is oxidized on its inner surface prior to mounting on the mandrel with the outer surface being oxidized after machining to produce the core. While particular desirable results have been achieved using aluminum treated by anodizing processes, it will be understood that other oxidizing processes could be used with aluminum, such as sputtering techniques, heat oxidation and the like and other processes more adapted to other specific metals may be used with other suitable metals.

While the present invention has been described by reference to certain of its preferred embodiments, it is pointed out that the embodiments described are illustrative rather than limiting in nature and that many variations and modifications are possible within the scope of the present invention. Many such variations and modifications may be considered obvious and desirable by those skilled in the art based upon a review of the foregoing description of preferred embodiments.

What is claimed is:

1. A method for producing a metallic core having an oxidized inner surface and an oxidized outer surface for use in a blanket cylinder or an image cylinder for use in an electrophotographic process, the method comprising:

a) producing a metallic tube having an inner diameter, an inner surface, an outer surface and an outer diameter, the inner diameter of the metallic tube being smaller than an outer diameter of a mandrel so that the metallic tube can be mounted with an interference fit over the outer diameter of the mandrel;

b) oxidizing the inner surface of the metallic tube to produce a metallic oxide layer on the inner surface of the metallic tube to produce an oxidized inner surface metallic tube;

c) positioning the oxidized inner surface metallic tube on the mandrel with an interference fit and machining an outer surface of the oxidized inner surface metallic tube to a desired diameter and finish; and d) oxidizing the outer surface of the oxidized inner surface metallic tube to produce the metallic core having an oxidized inner surface and an oxidized outer surface.

2. The method of claim 1, wherein the oxidized inner surface metallic tube is removed from the mandrel prior to oxidizing the outer surface.

3. The method of claim 1, wherein the outer surface of the oxidized inner surface metallic tube after machining is oxidized.

4. A method for producing an aluminum core having an oxidized inner surface and an oxidized outer surface for use in a blanket cylinder or an image cylinder for use in an electrophotographic process, the method comprising:

a) producing an aluminum tube having an inner diameter, an inner surface, an outer surface and an outer diameter, the inner diameter of the aluminum tube being smaller than an outer diameter of a mandrel so that the aluminum tube can be mounted with an interference fit over the outer diameter of the mandrel;

b) oxidizing the inner surface of the aluminum tube to produce an aluminum oxide layer on the inner surface of the aluminum tube to produce an oxidized inner surface aluminum tube;

c) positioning the oxidized inner surface aluminum tube on the mandrel with an interference fit and machining an outer surface of the oxidized inner surface aluminum tube to a desired diameter and finish; and d) oxidizing the outer surface of the oxidized inner surface aluminum tube to produce the aluminum core having the oxidized inner surface and an oxidized outer surface.

5. The method of claim 4, wherein the oxidized inner surface aluminum tube is removed from the mandrel prior to oxidizing the outer surface.

6. The method of claim 4, wherein the inner surface of the aluminum tube is oxidized by at least one of an anodizing process, a heating-in-oxygen process or a sputtering process.

7. The method of claim 4, wherein both the outer surface of the aluminum tube after machining and the inner surface of the aluminum tube are oxidized by at least one of an anodizing process, a heating-in-oxygen process or a sputtering process.

8. In a method for producing a metallic core for use in blanket cylinder or an image cylinder for use in an electrophotographic process by producing a metallic tube having an inner diameter, an inner surface, an outer surface and an outer diameter, the inner diameter of the metallic tube being smaller than an outer diameter of a mandrel so that the metallic tube can be mounted with an interference fit over the outer diameter of the mandrel and positioning the metallic tube on the mandrel with an interference fit and machining the outer surface of the metallic tube to a desired diameter and finish; the improvement comprising oxidizing the inner surface of the metallic tube prior to positioning the metallic tube on the mandrel.

9. The method of claim 8, wherein the outer surface of the metallic tube is oxidized after machining.

10. The method of claim 8, wherein both the outer surface of the metallic tube after machining and the inner surface of the metallic tube are oxidized.

11. In a method for producing an aluminum core for use in a blanket cylinder or an image cylinder for use in an electrophotographic process by producing an aluminum tube having an inner diameter, an inner surface, an outer surface and an outer diameter, the inner diameter of the aluminum tube being smaller than an outer diameter of a mandrel so that the aluminum tube can be mounted with an interference fit over the outer diameter of the mandrel and positioning the aluminum tube on the mandrel with an interference fit and machining an outer surface of the aluminum tube to a desired diameter and finish; the improvement comprising oxidizing the inner surface of the aluminum tube prior to positioning the aluminum tube on the mandrel.

12. The improvement of claim 11, wherein the outer surface of the aluminum tube is oxidized after machining.

13. The improvement of claim 11, wherein the inner surface of the aluminum tube is oxidized by at least one of an anodizing process, a heating-in-oxygen process or a sputtering process.

14. The improvement of claim 11, wherein the outer surface of the aluminum tube after machining and the inner surface of the aluminum tube are oxidized.

* * * * *